(12) United States Patent
Baker et al.

(10) Patent No.: US 7,328,700 B2
(45) Date of Patent: Feb. 12, 2008

(54) RESPIRATORY SYSTEM AND METHOD OF USE

(75) Inventors: Derek S. Baker, Lake Elmo, MN (US); Brandon H. Harmon, St. Paul, MN (US)

(73) Assignee: 3M Innovative Properties, St. Paul, MN (US)

( * ) Notice: Subject to any disclaimer, the term of this patent is extended or adjusted under 35 U.S.C. 154(b) by 644 days.

(21) Appl. No.: 10/383,713

(22) Filed: Mar. 7, 2003

(65) Prior Publication Data

US 2004/0173215 A1 Sep. 9, 2004

(51) Int. Cl.
*A61M 11/00* (2006.01)

(52) U.S. Cl. .................................. 128/205.24

(58) Field of Classification Search ........... 128/202.22, 128/202.27, 201.29, 202.14, 204.26, 201.28, 128/205.24; 137/516.27, 517, 883; 239/569, 239/570, 571, 572
See application file for complete search history.

(56) References Cited

U.S. PATENT DOCUMENTS

| | | | | |
|---|---|---|---|---|
| 2,444,393 A * | 6/1948 | Woo | ........................ | 128/200.27 |
| 2,775,968 A * | 1/1957 | Polli et al. | ............... | 128/205.12 |
| 2,945,501 A * | 7/1960 | Bloom | ..................... | 137/493.6 |
| 3,122,162 A | 2/1964 | Sands | ......................... | 137/498 |
| 3,326,233 A | 6/1967 | Perruzzi | | |
| 3,727,250 A * | 4/1973 | Koehn et al. | ............... | 405/186 |
| 4,083,380 A * | 4/1978 | Huber | ..................... | 137/505.25 |
| 4,174,731 A | 11/1979 | Sturgis et al. | ............... | 137/489 |
| 4,456,029 A | 6/1984 | McCrum | ..................... | 137/498 |
| 4,649,912 A * | 3/1987 | Collins | ................... | 128/202.13 |
| 4,958,633 A | 9/1990 | Angell | ................... | 128/201.19 |
| 5,037,063 A * | 8/1991 | Kerger et al. | ............ | 251/149.8 |
| 5,273,030 A * | 12/1993 | Crome | .................... | 128/202.11 |
| 5,509,436 A | 4/1996 | Japuntich et al. | ............. | 137/15 |
| 5,724,963 A * | 3/1998 | Seeley | ................... | 128/206.15 |
| 5,878,743 A | 3/1999 | Zdrojkowski et al. | | |
| 6,045,121 A | 4/2000 | Barker et al. | ............... | 251/306 |
| 6,047,698 A | 4/2000 | Magidson et al. | ..... | 128/207.12 |
| 6,070,577 A | 6/2000 | Troup | | |
| 6,374,852 B1 * | 4/2002 | Olivas | ..................... | 137/493.9 |
| 2003/0111076 A1* | 6/2003 | Baker | .................... | 128/201.28 |
| 2004/0040559 A1* | 3/2004 | Moody et al. | ........ | 128/204.18 |

FOREIGN PATENT DOCUMENTS

FR 1037477 9/1953
WO WO 86/00681 1/1986

* cited by examiner

*Primary Examiner*—Steven O. Douglas

(57) ABSTRACT

A respiratory protection circuit of the type having an air flow regulator disposed in an air flow path between an air supply and a respirator is improved by including an air flow splitter and a bi-directional valve. The air flow splitter is disposed in the air flow path upstream from the air flow regulator, the splitter dividing the air flow path into first and second downstream flow paths, with the first downstream flow path leading to the respirator. The bi-directional valve is disposed in the second downstream flow path wherein the bi-directional valve prevents excessive downstream air flow therethrough and prevents upstream air flow therethrough.

35 Claims, 6 Drawing Sheets

RESPIRATORY SYSTEM AND METHOD OF USE

BACKGROUND OF THE INVENTION

The present invention is a bi-directional valve for use in an air regulating device. In particular, the valve prevents excessive amounts of air from flowing to an accessory tool and prevents air from the accessory tool from entering a respirator's air supply line.

In the painting and auto body markets, a respirator is used by an operator for protection from harmful fumes and contaminants. At the same time, air is supplied to accessory pneumatic tools. Currently, a user drags two air line hoses while work is done, one supplying air to the accessory tool and one supplying air to the respirator. Using two air supply lines is cumbersome to the user because the airline hoses become entangled with objects in the work area, such as a paint booth, or between themselves. Keeping track of the multiple air lines reduces worker productivity and raises concerns that new paint may be ruined if the air supply lines snag, twist or rub against the newly painted surface. To alleviate this problem, painters have tried taping the two airline hoses together. However, the two airlines still twist and kink in use.

An air regulating device is typically used to regulate the flow and pressure of breathable air to a user's respirator. In some cases, the air regulating device may be used to deliver additional air to an accessory pneumatic tool, whereby the respirator and the pneumatic tool use the same air supply line. Respirator manufacturers have been working with the National Institute for Occupational Safety and Health (NIOSH) to develop and approve a single air line system that provides air to a user's respirator and also to an accessory pneumatic tool. However, a viable air regulating device that will provide the user breathable air and deliver additional air to the accessory tool has not been developed. NIOSH is concerned that any such regulating device not allow air deprivation to the respiratory user and that such a device not allow potential back flow of contaminants from the accessory tool into the user's air stream.

Thus, there is a need for an air regulating device that prevents unwanted contaminants from entering the breathable air from the accessory tool and insures that excessive air flow to the accessory tool does not deprive the respirator user of breathable air.

BRIEF SUMMARY OF THE INVENTION

The present invention relates to an improved respiratory protection circuit of the type having an airflow regulator disposed in an airflow path between an air supply and a respirator. The improvement comprises an airflow splitter and a bi-directional valve. The airflow splitter is disposed in the airflow path upstream from the airflow regulator, and divides the airflow path into first and second downstream flow paths, with the first downstream flow path leading to the respirator. The hi-directional valve is disposed in the second downstream flow path, prevents excessive downstream airflow therethrough and prevents upstream airflow therethrough.

BRIEF DESCRIPTION OF THE DRAWINGS

The present invention will be further explained with reference to the attached figures, wherein like structure is referred to by like numerals throughout the several views.

While the above-identified drawing figures set forth one embodiments of the invention, other embodiments are also contemplated, as noted in the discussion. In all cases, this disclosure presents the present invention by way of representation and not limitation. It should be understood that numerous other modifications and embodiments can be devised by those skilled in the art which fall within the scope and spirit of the principles of this invention.

DETAILED DESCRIPTION

Figure 1:
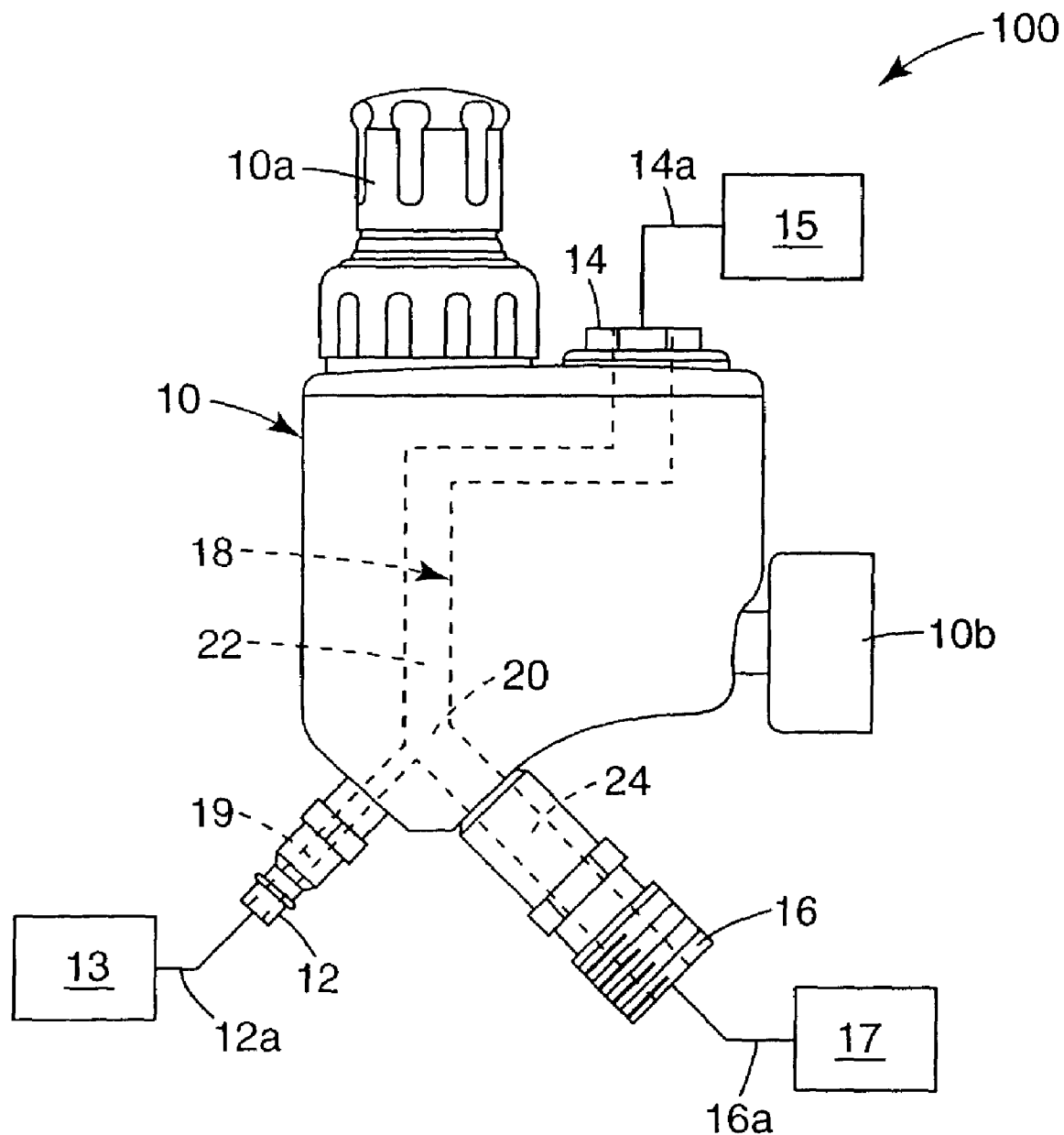
FIG. 1 is an elevational view of a respiratory protection system, including an air regulation device.

FIG. 1 is an elevational view of an air regulating device 10 included in a respiratory protection system 100. The air regulating device 10 regulates flow and pressure of breathable air to a user's respirator. The respiratory protection system 100 defines an air flow circuit where the air regulating device 10 is disposed in an air flow path between an air supply 13 and a respirator 15. The air regulating device 10 maintains a uniform output flow to the user given a broad range of input pressures, and typically includes knob 10a used to set the desired air flow to the respirator 15. The air flow regulating device 10 may also include an air pressure or air flow gauge 10b to provide a visual indicator of air pressure or flow to the user. In addition to providing uniform flow to the user, in one embodiment the air regulating device 10 has an integrated bi-directional valve 11 (shown in FIG. 2). The valve 11 is able to prevent excessive amounts of output air flow from being delivered to an auxiliary air appliance and prevent air back flow from the auxiliary air appliance to the air supply 13 and, in particular, to the user's respirator 15.

In the embodiment of FIG. 1, the air regulating device 10 has three ports (12, 14, 16) for directing air flow into and out of the device 10. The three ports include an inlet 12 and first and second outlets 14, 16. One end of an air supply line 12a is attached to the inlet 12 of the air regulating device 10 for providing air to the device 10 from the air source 13. The respirator 15 is attached to the first outlet 14 by airline 14a and an auxiliary air appliance 17, such as a pneumatic tool or paint sprayer, is attached to the second outlet 16 by airline 16a.

Air supplied from the air supply line 12a is distributed to either the respirator 15 or the auxiliary air appliance 17 by the air regulating device 10. An airflow splitter 18 is disposed within the air regulation device 10, the splitter defining an air line manifold interconnecting the inlet 12, the first outlet 14 and the second outlet 16. Air from the air supply line 12a enters the air regulating device 10 through the inlet 12 and passes through a first passageway 19 to a central portion 20 of the splitter 18 before being distributed to the respirator 15 or the auxiliary air appliance 17. A second passageway 22 extends between the central portion 20 and the first outlet 14, and a third passageway 24 extends between the central portion 20 and the second outlet 16. Both the second and third passageways 22 and 24 define downstream flow paths, with the air splitter 18 dividing the airflow path into the first downstream flow path 22 and the second downstream flow path 24. The airflow through the second passageway 22 is user controlled by manipulation of the knob 10a and may be monitored by gauge 10b.

Figure 2:
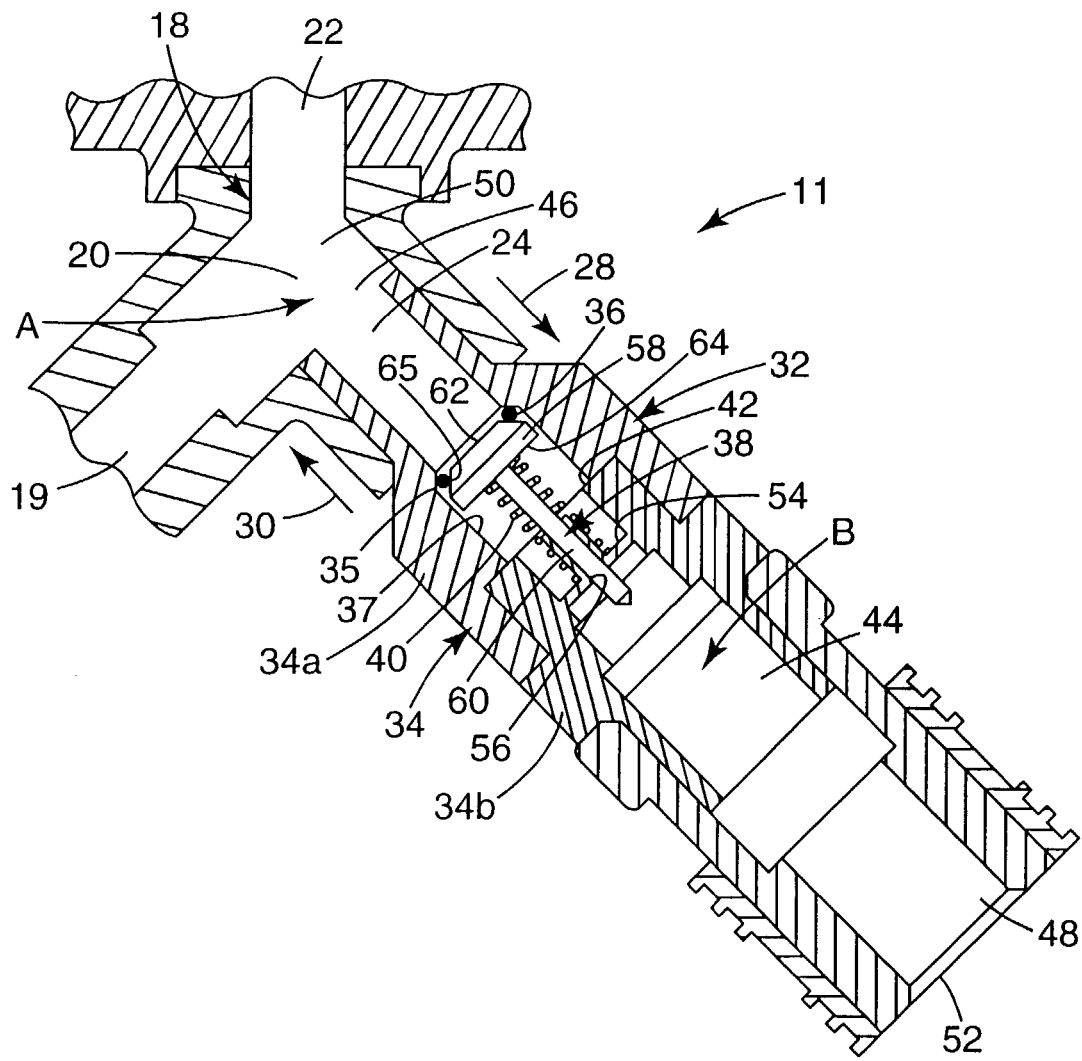
FIG. 2 is a cross-sectional view of a portion of the air regulating device of FIG. 1, showing a bi-directional valve therein.

FIG. 2 is a cross-sectional view of the bi-directional valve 11 of the air regulating device 10 of FIG. 1. The valve 11 is located in the third passageway 24, (the passageway leading to the air outlet 16 which is connected via airline 16a to the auxiliary air appliance 17). The valve 11 permits a predetermined amount of air to flow and pass downstream in a first direction 28 from the air supply line 12a to the auxiliary air appliance 17. The valve 11 prevents an excessive amount of air, greater than a predetermined amount of flow, from passing in the first direction 28 from the air supply line 12a to the auxiliary air appliance 17. For example, if the airline to the auxiliary air appliance 17 becomes severed or if the appliance consumes large capacities of air, the valve 11 will sense the increased air flow and terminate the flow of air to the second outlet 16. Thus, while the flow of air to the auxiliary air appliance 17 may be terminated, an adequate flow of air is maintained to respirator 15 at all times. If the second outlet 16 is connected to a higher source of pressure than that of the air source 13, the valve 11 will sense the pressure differential and close the air flow path from the auxiliary air appliance 17, thereby eliminating the possibility of upstream contaminant flow (i.e., backflow) into the respirator 15 from the auxiliary air appliance 17.

The bi-directional valve 11 forms a moveable air flow barrier and is comprised of a valve assembly 32, which includes a valve body 34 (shown in FIGS. 3, 4, & 5), an O-ring or gasket 36, a valve piston 38, a valve spring 40, and a valve seat 42. The valve body 34 (formed from valve body sections 34a and 34b) is disposed in the downstream flow path 24 and defines a valve chamber 44. The valve body 34 has an inlet 46 and an outlet 48, and defines the valve chamber 44 extending between the inlet 46 and the outlet 48. The inlet 46 is located proximate a first end 50 of the passageway 24 adjacent a central portion 20 of the splitter and the outlet 48 of the valve body 34 is located at a second end 52 of the passageway 24 proximate the air outlet 16 of the passageway 24.

Figure 6:
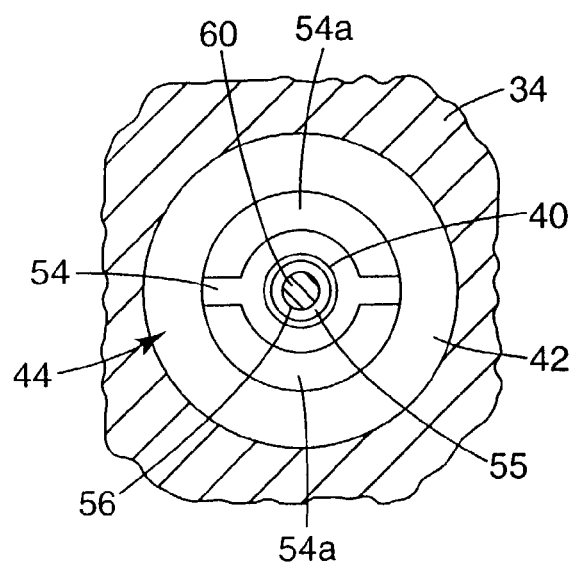
FIG. 6 is a cross-sectional view as taken along line 6-6 of FIG. 4.

The O-ring 36 is radially disposed in the valve body 34, proximate the inlet 46. An annular seat or groove 35 formed in an inner wall 37 of the valve body 34 holds the O-ring 36 in place. The valve seat 42 is radially disposed in the valve chamber 44 between the O-ring 36 and the valve body outlet 48. The valve seat 42 includes a radially extending spring seating surface 54 which extends into the valve chamber 44. However, as seen in FIG. 6, the spring seating surface 54 includes at least one opening 54a for air flow from the inlet 46 to the outlet 48 when the valve 11 is open. A piston guide 55 extends from the spring seating surface 54 toward the valve chamber 44. The piston guide 55 and spring seating surface 54 also include an opening 56 to hold and align the piston 38 in place for movement. The valve piston 38 includes a head 58 and a body 60. The valve piston 38 is slidably disposed in the valve chamber 44 with the head 58 located between the O-ring 36 and the valve seat 42. The piston head 58 has a front surface 62 facing the O-ring 36 and a rear surface 64 facing the valve seat 42 and spring seating surface 54. On its front surface 62, the piston head 58 has a conical surface portion 65 which is aligned, at times, to engage the O-ring 36. The body 60 is attached to the rear surface 64 of the head 58 and extends rearward from the head 58 towards the outlet 48 of the valve body 34. The opening 56 is generally cylindrical, and is adapted to axially slidably receive the body 60 of the valve piston 58 therein. Within the air regulating device 10, a first region (region A) is formed forward of the valve piston 38 (on the upstream, front surface 62 side of the head 58) and a second region (region B) is formed rearward of the valve piston 38 (on the downstream, rear surface 64 side of the head 58).

The valve piston 38 is movable between a first position, a second position, and a third position within the valve chamber 44. The valve 11 shown in FIG. 2 is in the first position, or a first closed position. The valve spring 40 is disposed between the rear surface 64 of the piston head 58 and the spring seating surface 54, coaxial with the piston guide 55. The valve spring 40 biases the piston 38 to the first position. In alternative embodiments of the present invention, other devices, such as, for example, an elastic member, may be used to bias the valve 11 to the first position.

Figure 3:
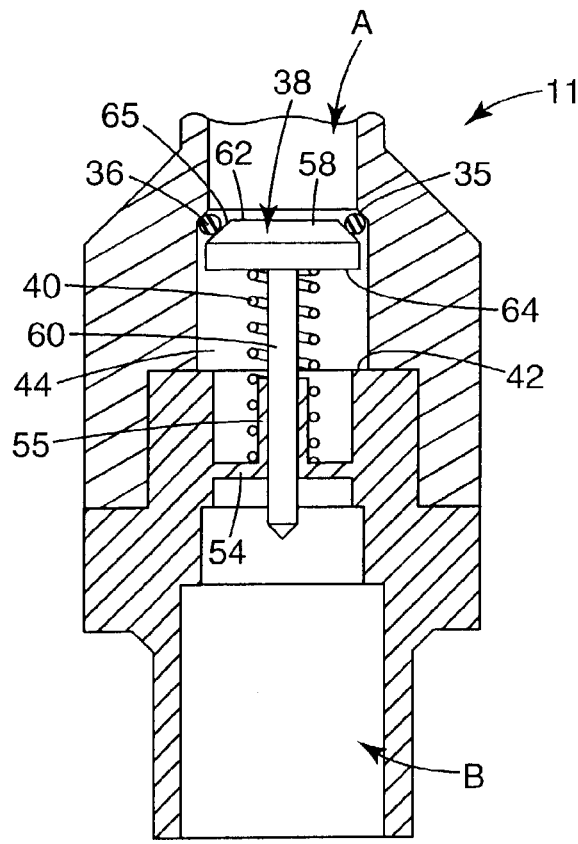
FIG. 3 is an enlarged cross-sectional view of a portion of the valve, showing a piston of the valve in a first position.

FIG. 3 is an enlarged cross-sectional view of the bi-directional valve 11 (or check valve), showing the valve piston 38 in its first position, or proximal closed position. When the valve piston 38 is in the first position, the valve 11 functions in a check valve mode to prevent air from entering the respirator user's air supply 14a from the auxiliary air appliance 17. In the case of air entrainment, or when the pressure in region B is greater than the pressure of air supplied to the air regulating device 10 in region A, air flows from the auxiliary air appliance 17 to the respirator 15. The valve spring 40 biases the front surface 62 of the piston head 58 against the O-ring 36 to create a fluid flow seal.

In the first position, the conical surface portion 65 of the front surface 62 of the piston head 58 abuts the O-ring 36 to prevent air from flowing upstream from outlet 48 to the inlet 46 of the valve body 34, and in particular from the auxiliary air appliance 17 to the user's air supply 14a. The valve spring 40 provides a predetermined force to the valve piston 38 that urges the head 58 against the O-ring 36. If the pressure increases in region B, the upstream-directed force urging the valve piston 38 towards the O-ring 36 increases and the O-ring 36 is further compressed to create a tighter seal between the piston head 58 and the O-ring 36 than that of the valve spring 40 alone. The valve 11, when functioning as a check valve, is designed in one embodiment such that a leak rate does not exceed 15 ml/min at 0.5 inches of $H_2O$ of vacuum on the downstream side of the check valve. Furthermore, the piston head 58 does not include any bleed holes which would contribute to the leak rate when the valve 11 is sealed.

Figure 4:
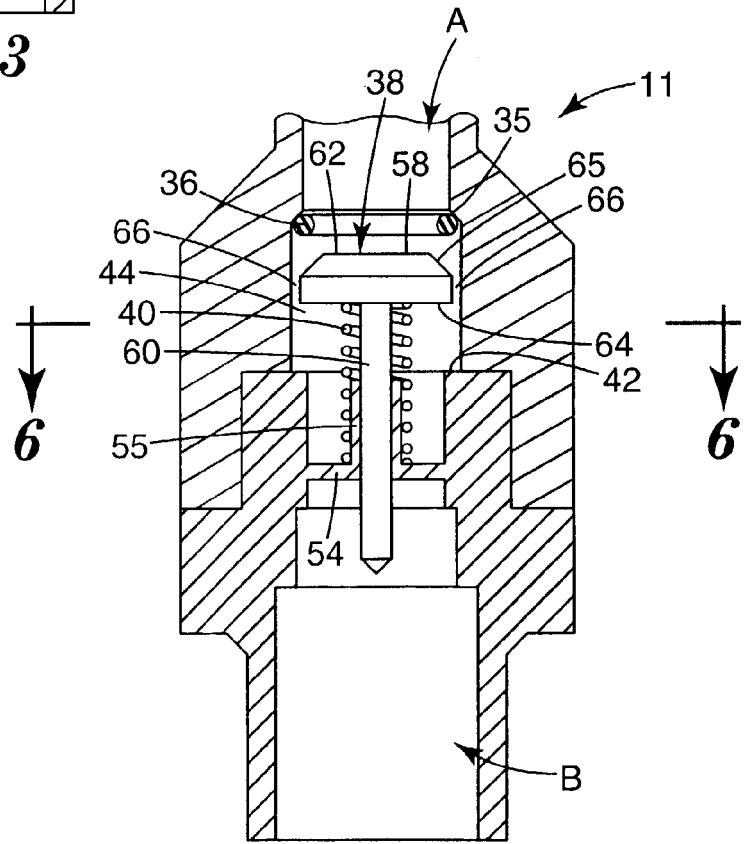
FIG. 4 is an enlarged cross-sectional view of a portion of the valve, showing the piston of the valve in a second position.

FIG. 4 is an enlarged cross-sectional view of the bi-directional valve 11, showing the valve piston 38 in its second position, or open position. In the second position, the piston head 58 "floats" within the valve chamber 44 between the O-ring 36 and the valve seat 42. Between the outer portions of the piston head 58 and the inner wall 37 of the valve body 34 is an annular clearance 66, which allows air to flow around the piston head 58. Downstream air flow past the head 58 is facilitated by the conical surface portion 65 of the front surface 62 of the head 58. Thus, air flows downstream through the valve chamber 44 and the openings in the spring seating surface 54, from the inlet 46 to the outlet 48 of the valve body 34, to supply airline 16a to the auxiliary air appliance 17. When valve 11 is in the second position, the downstream-directed force acting on the head 58 due to pressure and air impingement on the front surface 62 (upstream side) of head 58 is equal to the force acting on the piston due to the spring lift force and that created by air vortices on the rear surface 64 (downstream side) of head 58.

While allowing air flow, the bi-directional valve 11 also operates to eliminate excessive downstream flow through the valve chamber 44. Upon opening, the valve spring 40 provides a force load against the piston head 58 of the valve piston 38 that increases as the valve spring 40 is compressed. The spring force resists movement of the valve piston 38 and the force due to initial air impingement on the front surface 62 of the head 58 of the valve piston 38 and during cracking of the valve 11. As air flow from the air supply line 12a increases from zero to a designated flow rate, the flow-streams create a lift force on the downstream side of the valve piston 38 (region B). The piston 38 moves to the second position, between the O-ring 36 and the valve seat 42, as the air flow increases to the designated flow rate. In one embodiment, the designated flow rate is between about 16 cfm and about 17.5 cfm. As the flow rate approaches a predetermined set value, the velocity of the air increases as it flows around the valve piston 38 and eventually creates a vacuum on the downstream side of the valve piston 38 (region B). When the vacuum is created on the immediate downstream side of the valve piston 38 (adjacent the rear surface 64 thereof), the impingement force is no longer balanced from the lift force and the valve piston 38 moves to the third position to prevent further flow to the auxiliary air appliance from occurring.

Figure 5:
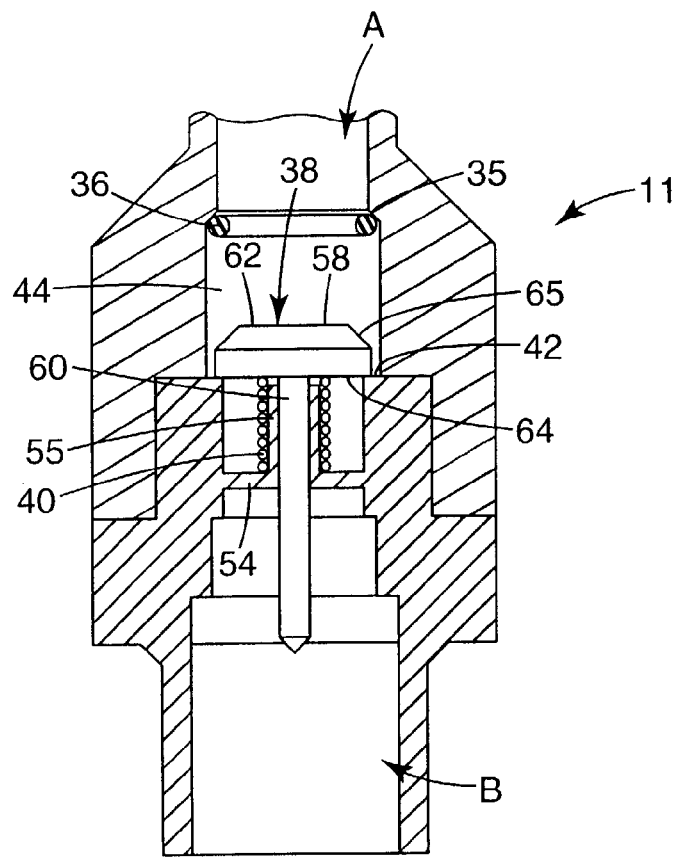
FIG. 5 is an enlarged cross-sectional view of a portion of the valve, showing the piston of the valve in a third position.

FIG. 5 is an enlarged cross-sectional view of the bi-directional valve 11, showing the valve piston 38 in its third position, or distal closed position. In the third position, the rear surface 64 of the piston head 58 abuts a radial shoulder of the valve seat 42. As the air flow from the air supply line 12a approaches a predetermined set value, the velocity of the air increases as it flows around the valve piston 38 and creates a vacuum on the downstream side (region B) of the valve piston 38. The upstream impingement force is no longer balanced from the downstream lift force, and the valve piston 38 moves towards the valve seat 42 to prevent further flow to the auxiliary air appliance 17 from occurring. Thus, excessive flow to the auxiliary air appliance 17 is eliminated. Restricting air flow to the auxiliary air appliance 17 is advantageous because adequate air flow to the respirator 15 is maintained. In one embodiment, the predetermined set value for flow through the third passageway 24, or the valve chamber 44, to move valve piston 38 from the second position to the third position is greater than 17.5 cfm.

Once the valve piston 38 is in its third position (FIG. 5), there is, of course, no air flow past the valve piston 38. In order to move the valve piston 38 out of its third position, the pressure in region A must be lowered until the combined forces of the pressure in region B and the spring 40 are sufficient to overcome the force due to the pressure in region A. Once that happens, the spring 40 acts to move the valve piston 38 back to its first position (FIG. 3), limiting backflow. As the air pressure in region A is then increased, the spring 40 is compressed and the valve piston 38 moves to its second position (FIG. 4), permitting air flow past the valve 11 and to the auxiliary air appliance 17.

FIG. 6 is a cross-sectional view of a portion of the bi-directional valve 11 taken along line 6-6 of FIG. 4. The opening 56 is defined by the piston guide 55 and spring seating surface 54 to hold and align the piston body 60 in place. One or more openings 54a between the spring seating surface 54 and the valve chamber 44 allow air flow to pass between the inlet 46 and the outlet 48 of the valve body 34.

During use, air is continually supplied by the inventive respiratory protection circuit to the operator's respirator, but is only provided to the auxiliary air appliance on demand. Accordingly, when there is no demand for air to the auxiliary air appliance, the valve piston of the bi-directional valve will assume the first position, as seen in FIG. 3. An O-ring is employed as the seal in the first position in order to provide a compliant sealing member (and thus a more positive seal than a metal-to-metal seal) and to serve as a replaceable wear member. When the inventive respiratory protection circuit is used, for example, in a paint spraying application, there may be as many as 23,000 opening/shutting cycles/day for the valve piston against the O-ring (during an 8-hour shift). The O-ring thus provides, in combination with the conical surface portion on the piston head's front surface, a highly reliable, highly effective and inexpensive seal component for the bi-directional valve.

In the embodiment of the respiratory protection circuit 100 shown in FIG. 1, the splitter 18, the regulator 10 and the bi-directional valve 11 are disposed in a common housing. In alternative embodiments of the inventive respiratory protection circuit, the bi-directional valve 11 may be housed in different components or housings of the air protection circuit than the splitter 18 and the regulator 10. In addition, the second outlet 16 may be remote from the regulator 10.

Figure 7:
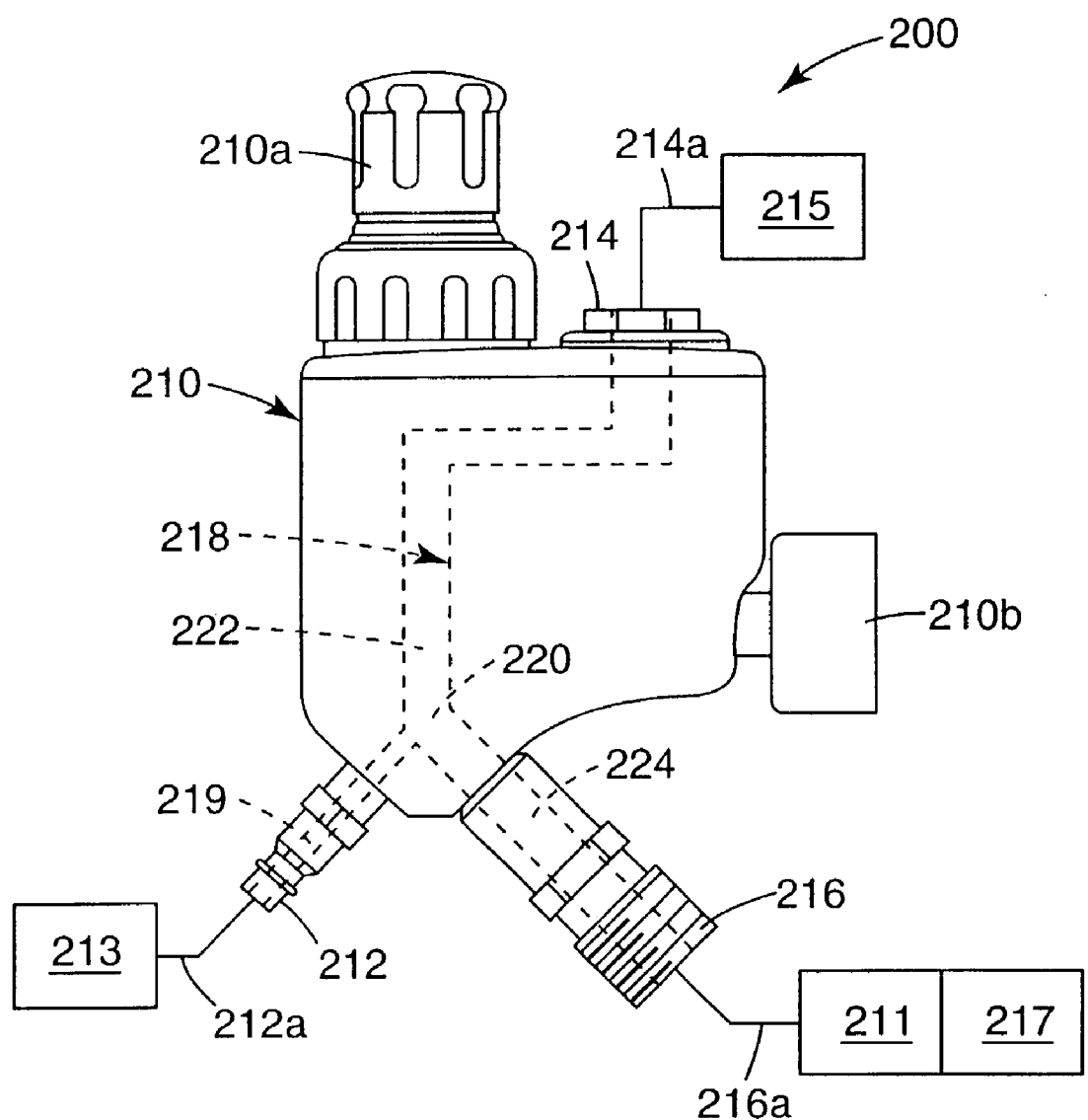
FIG. 7 is an elevational view of a further embodiment of a respiratory protection system.
Figure 8:
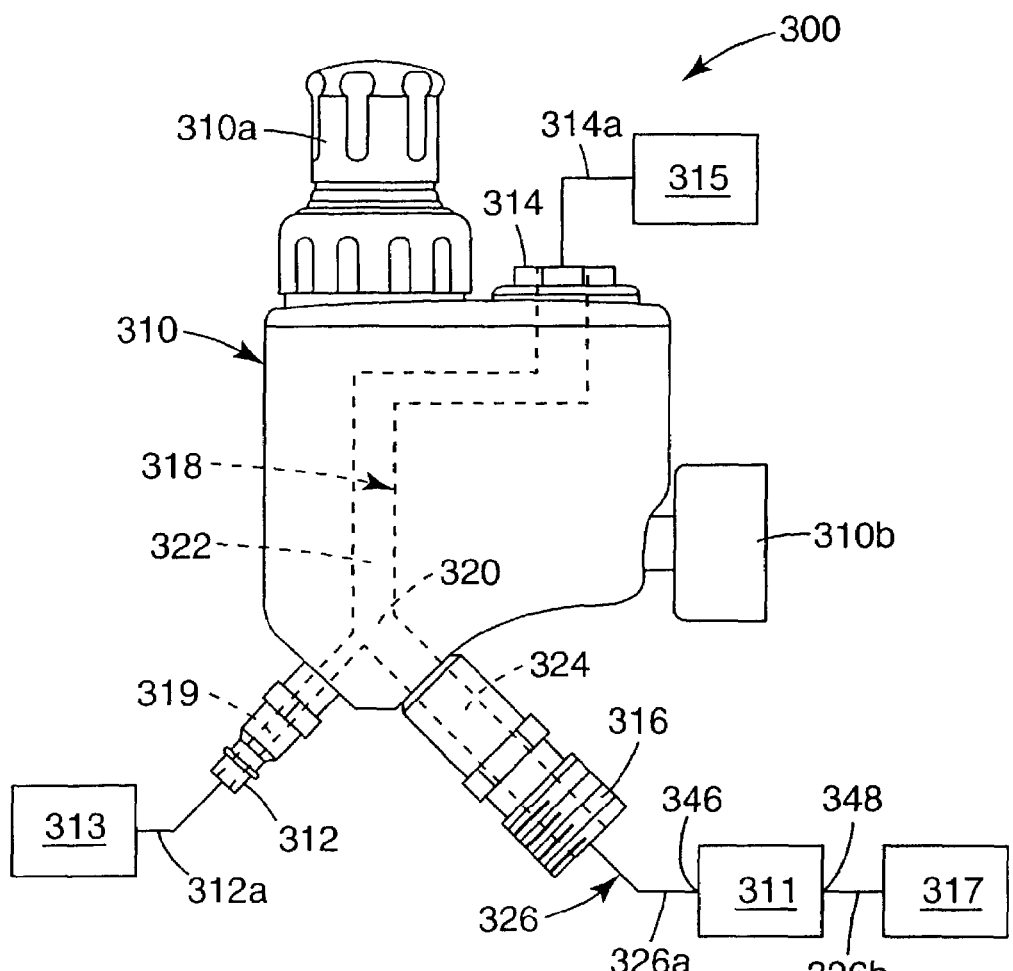
FIG. 8 is an elevational view of a further embodiment of a respiratory protection system.

FIGS. 7 and 8 are elevational views of alternative embodiments of the inventive respiratory protection circuit. In FIG. 7, an air regulating device 210 regulates flow and pressure of breathable air to a user's respirator 215. In this version of the respiratory protection circuit 200, a bi-directional valve 211 is not integrated into a common housing with the air regulating device 210, but is separate therefrom. The air regulating device 210, like the device 10, maintains the uniform output flow to the user given a broad range of input pressures, and includes a flow regulator dial 210a and gauge 210b for that purpose.

Air supplied from an air source 213 via air supply line 212a is distributed to either the respirator 215 or the auxiliary air appliance 217 by the air regulating device 210. An air flow splitter 218 is disposed within the air regulation device 210, the splitter defining an airline manifold interconnecting an inlet 212, a first outlet 214, and a second outlet 216. Air from the air supply line 212a enters the air regulating device 210 through the inlet 212 and passes through a first passageway 219 to a central portion 220 of the splitter 218 before being distributed to the respirator 215, via airline 214a, or the auxiliary air appliance 217, via airline 216a. A second passageway 222 extends between the central portion 220 and the first outlet 214, and a third passageway 224 extends between the central portion 220 and the second outlet 216. Both the second and third passageways 222 and 224 define downstream flow paths, with the air splitter 218 dividing the air flow path into the first downstream flow path 222 and the second downstream flow path 224.

In FIG. 7, the respiratory protection circuit 200 includes the bi-directional valve 211 either mounted on an auxiliary air appliance 217 or disposed in a common housing with the auxiliary air appliance 217. The auxiliary air appliance 217 is fluidly coupled to the second outlet 216 of the air flow regulator 210 by airline 216a. The bi-directional valve 211 is disposed at an end of the airline 216a opposite from the second outlet 216. The auxiliary air appliance 217 is then fluidly coupled to the bi-directional valve assembly 211. The bi-directional valve 211 in the respiratory protection circuit 200 functions in the same manner as described with respect to the valve 11 in FIGS. 1-6 to prevent excessive downstream air flow through the valve 211 and to prevent upstream air flow from the auxiliary air appliance 217 to the user's respirator 215.

In FIG. 8, an air respiratory protection circuit 300 is shown having an air regulation device 310. In this version of the air respiratory protection circuit, air regulating device 310 regulates flow and pressure of breathable air to a user's respirator. A bi-directional valve 311 is disposed within an airline 316a, and separated from the air regulation device 310 and an air auxiliary appliance 317. The air regulating device 310, like the device 10, maintains a uniform output flow to the user given a broad range of input pressures, and includes a flow regulator dial 310a and gauge 310b for that purpose.

Air supplied from an air supply line 312a, connected to air source 313, is distributed to either the respirator 315 (via airline 314a) or the auxiliary air appliance 317 by the air regulating device 310. An air flow splitter 318 is disposed within the air regulation device 310, the splitter defining an air line manifold interconnecting an inlet 312, a first outlet 314 and a second outlet 316. Air from the air supply line 312a enters the air regulating device 310 through the inlet 312 and passes through a first passageway 319 to a central portion 320 of the splitter 318 before being distributed to the respirator 315 or the auxiliary air appliance 317. A second passageway 322 extends between the central portion 320 and the first outlet 314, and a third passageway 324 extends between the central portion 320 and the second outlet 316. Both the second and third passageways 322 and 324 define downstream flow paths, with the air flow splitter 318 dividing the air flow path into the first downstream flow path 322 and the second downstream flow path 324.

In FIG. 8, the respiratory protection circuit 300 includes the bi-directional valve 311 disposed within an airline 326 between the air regulation device 310 and the air auxiliary appliance 317. The auxiliary air appliance 317 is fluidly coupled to the second outlet 316 of the air flow regulator 310 by airline 326a. In the embodiment shown in FIG. 8, the bi-directional valve 311 is disposed within the airline 326 connecting the auxiliary air appliance 317 to the air flow regulator 310. Thus, a portion 326a of the airline 326 connects the outlet 316 and an inlet 346 of valve 311, and a portion 326b of airline 326 connects an outlet 348 of valve 311 with the air auxiliary appliance 317. The bi-directional valve 311 in the respiratory protection circuit 300 functions in the same manner as described above with respect to the valve in FIGS. 1-6 to prevent excessive downstream air flow through the valve 311 and to prevent upstream air flow from the auxiliary air appliance 317 to the user's respirator 315.

Figure 9:
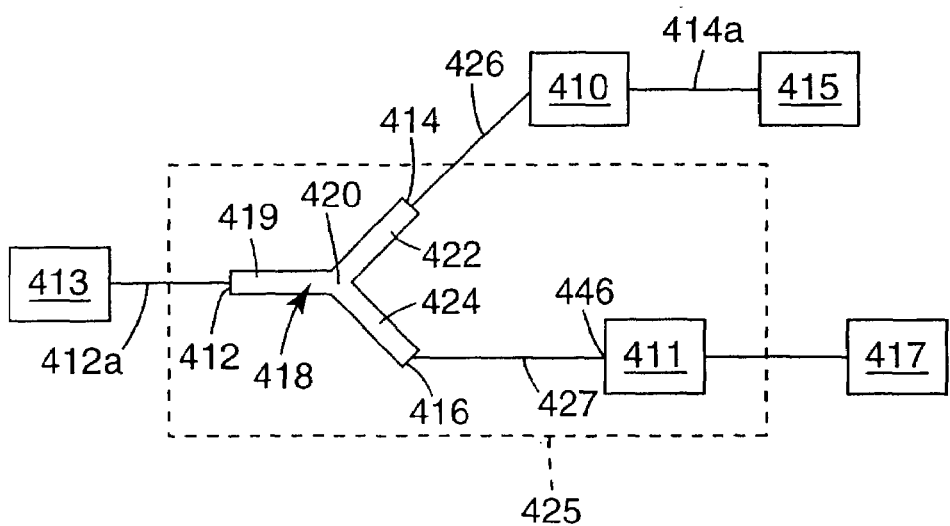
FIG. 9 is a schematic illustration of a further embodiment of a respiratory protection system.

In another alternative embodiment, the splitter is separated from the air regulating device (i.e., they are not in a common housing), and the splitter and air regulating device may be coupled together or connected via an airline. In this instance, the splitter and the bi-directional valve may be in a common housing, coupled together or connected via an airline. A respiratory protection circuit 400 illustrating one such arrangement is shown schematically in FIG. 9.

The respiratory protection circuit 400 includes an air regulating device 410, a bi-directional valve 411, an air supply 413, a respirator 415, an air auxiliary appliance 417, and an air splitter 418. As illustrated in phantom in FIG. 9, common housing 425 houses the splitter 418 and the bi-directional valve 411. The air splitter 418 includes a first passageway 419, a second passageway 422, and a third passageway 424. A central portion 420 interconnects the three passageways of the air splitter 418. The air supply source 413 is fluidly coupled to an inlet 412 of the first passageway 419 by an air supply line 412a. Air from the air supply line 412a enters the air splitter 418 and passes through the first passageway 419 to a central portion 420 of the splitter 418 before being distributed to the air regulating device 410 or the auxiliary air appliance 417. A second passageway extends between the central portion 420 and a first outlet 414, and a third passageway 424 extends between the central portion 420 and a second outlet 416. Both the second and third passageways 422 and 424 define downstream flow paths, with the air splitter 418 dividing the air flow path into the first downstream flow path 422 and the second downstream flow path 424.

The air regulating device 410 is fluidly coupled to the first outlet 414 of air splitter 418 by either an airline 426 or a direct connection. The respirator 415 is fluidly coupled to an outlet of the air regulating device 410 by an airline 414a. An inlet 446 of the bi-directional valve 411 is fluidly coupled to the second outlet 416 of air splitter 418 by either an airline 427 or a direct connection. Finally, the air auxiliary appliance 417 is fluidly coupled to an outlet 448 of the bi-directional valve 411 by an airline or a direct connection.

The bi-directional valve 411 in the respiratory protection circuit 400 functions in the same manner as described above with respect to FIGS. 1-6 to prevent excessive downstream air flow through the valve 411 and to prevent upstream air flow from the auxiliary air appliance 417 to the user's respirator 415. The air regulating device 410, like the device 10, maintains the uniform output flow to the user given a broad range of input pressures, and may include a flow regulator dial and gauge for that purpose.

The respiratory protection system of the present invention regulates air flow through an air regulation device connecting a respirator and an auxiliary air appliance to an air supply line. Air is supplied to the air regulating device from the air supply line at a supply air pressure. A moveable air flow barrier, for example a bi-directional valve is disposed between the air supply line and the auxiliary air appliance. Air is permitted to flow to the auxiliary air appliance from the air supply line when an upstream force on the air flow barrier is equal to or greater than a downstream force on the air flow barrier. No flow is permitted up to a predetermined force differential between the first and second forces. The upstream forces defined by the supply air pressure and the downstream force is defined in part by the auxiliary air appliance air pressure. Air is prevented from flowing from the auxiliary air appliance upstream toward the respirator when the upstream force is less than the downstream force.

In the respiratory protection circuit, an air flow regulator is disposed in an air flow path between an air supply and a respirator. The respiratory protection circuit includes an air flow splitter disposed in the air flow path upstream from the air flow regulator. The splitter divides the air flow path into first and second downstream flow paths, with the first downstream flow path leading to the respirator. The respiratory protection circuit further includes a bi-directional valve disposed in the second downstream flow path wherein the valve regulates the flow of air from an inlet of the valve to an outlet of the valve by preventing excessive air flow from the inlet to the outlet and preventing air backflow from the outlet to the inlet.

The bi-directional valve is for use in a respiratory protection circuit with an input for air from the air supply, a first outlet connected to the respirator, and a second outlet connected to an auxiliary air appliance. The air splitter interconnects the inlet, the first outlet and the second outlet.

The supply air from a single source is provided for both the respirator and the accessory tool. The valve restricts the amount of air flow from the air supply to the air appliance such that the respirator user maintains adequate flow to the respirator at all times. For example, if the auxiliary air appliance's airline becomes severed, or an appliance consuming large capacities of air is connected to the device, the valve will sense the increased flow and terminate flow through the outlet to the auxiliary air appliance. Furthermore, the valve prevents back flow of air from the auxiliary air appliance upstream to the respirator's air supply. If the second outlet (air appliance) is connected to a higher pressure than the inlet, the valve will close, or, if air flow to the first outlet (respirator) is higher than the air flow to the second outlet (air appliance), the valve will close. Thus, the valve does not allow back flow from the auxiliary air appliance to the respirator, thereby eliminating the possibility of contaminants flowing into the respirator user's air supply from the auxiliary air appliance.

Although the present invention has been described with reference to preferred embodiments, workers skilled in the art will recognize that changes may be made in form and detail without departing from the spirit and scope of the invention. For example, the bi-directional valve is not limited to use merely with air regulating devices. The present invention may also be used to manage the distribution and flow of other types of gases.

The invention claimed is:

1. An improved respiratory protection circuit of the type having an airflow regulator contained in an air regulating device, disposed in an airflow path between an air supply and a respirator, the improvement comprising:
   an airflow splitter disposed in the airflow path upstream from the airflow regulator, the splitter dividing the air flow path into first and second downstream flow paths, with the first downstream flow path leading to the respirator; and
   a bi-directional valve disposed in the second downstream flow path, wherein the bi-directional valve prevents excessive downstream airflow therethrough and prevents upstream airflow therethrough.

2. The improvement of claim 1, wherein the second downstream flow path leads to an auxiliary air appliance.

3. The improvement of claim 1, wherein the splitter and the regulator are disposed in a common housing.

4. The improvement of claim 3, wherein the bi-directional valve is disposed in the common housing.

5. The improvement of claim 1, wherein the splitter and bi-directional valve are disposed in a common housing.

6. The improvement of claim 1 wherein the bi-directional valve comprises:
   an O-ring radially disposed in the second downstream flowpath;
   a valve seat radially disposed in the second downstream flowpath, downstream from the O-ring;
   a valve piston having a head movable between the O-ring and the valve seat between a first position, a second position and a third position; and
   a valve spring aligned to urge the head of the valve piston toward the first position.

7. The improvement of claim 6 wherein in the first position the head of the valve piston abuts the O-ring to create a first seal and prevent upstream airflow.

8. The improvement of claim 7 wherein the valve spring provides a predetermined force to bias the head of the valve piston against the O-ring.

9. The improvement of claim 7 wherein increased pressure in a first region between the head of the valve piston and the valve seat defines an upstream-directed force on the head and tightens the first seal between the head and the O-ring.

10. The improvement of claim 6 wherein in the second position the head of the valve piston is disposed between the O-ring and the valve seat, and downstream airflow is permitted.

11. The improvement of claim 6 wherein the head of the valve piston is in the second position when a first force on the upstream side of the head is generally equal to a second force on a downstream side of the head, wherein the first force is defined by air pressure on the upstream side of the head and wherein the second force is defined in part by compression of the valve spring.

12. The improvement of claim 6 wherein in the third position the head of the valve piston abuts the valve seat to create a second seal and prevent downstream airflow.

13. The improvement of claim 6 wherein the head of the valve is in the third position when a first force on an upstream side of the head is greater than a second force on the downstream side of the head, wherein the first force is defined by air pressure on the upstream side of the head and wherein the second force is defined in part by compression of the valve spring.

14. An improved respiratory protection circuit including an air regulation device having an air supply line connected to the air regulation device at an inlet and a respirator line connected to the air regulation device at a first outlet, the improvement comprising:
   a splitter disposed within the air regulation device, the splitter defining an air line manifold interconnecting the inlet, the first outlet and a second outlet; and
   a bi-directional valve disposed between the manifold of the splitter and the second outlet wherein the bi-directional valve prevents excessive flow of air from the air supply line to the second outlet and prevents air backflow from the second outlet to the respirator line.

15. The improvement of claim 14 wherein the second outlet is on the air regulation device.

16. The improvement of claim 14 wherein the second outlet is remote from the air regulation device.

17. The improvement of claim 14, and further comprising:
   an auxiliary air appliance connected to the second outlet.

18. The improvement of claim 14 wherein the bi-directional valve comprises:
   an O-ring radially disposed between the manifold and the second outlet;
   a valve seat radially disposed between the O-ring and the second outlet;
   a valve piston having a head, the piston movably disposed between the O-ring and the valve seat wherein the piston is movable between a first position, a second position and a third position; and
   a valve spring aligned to urge the head of the piston toward the first position.

19. The improvement of claim 18 wherein in the first position the head of the piston abuts the O-ring to create a first seal and prevent air backflow from the second outlet to the respirator line.

20. The improvement of claim 19 wherein the valve spring provides a predetermined force to bias the piston against the O-ring.

21. The improvement of claim 19 wherein increased pressure in a first region between the head of the piston and the valve seat defines an upstream-directed force on the head and tightens the first seal between the head and the O-ring.

22. The improvement of claim 18 wherein in the second position the head of the piston is disposed between the O-ring and the valve seat, and air is permitted to flow from the air supply line to the second outlet.

23. The improvement of claim 18 wherein the head of the valve piston is in the second position when a first force on an upstream side of the head is generally equal to a second force on a downstream side of the head, wherein the first force is defined by air pressure in the air supply line and wherein the second force is defined in part by compression of the valve spring.

24. The improvement of claim 18 wherein in the third position the head of the piston abuts the valve seat to create a second seal and prevent air from flowing from the air supply line to the second outlet.

25. The improvement of claim 18 wherein the head of the valve piston is in the third position when a first force on an upstream side of the head is greater than a second force on a downstream side of the head, wherein the first force is defined by air pressure in the air supply line and wherein the second force is defined in part by compression of the valve spring.

26. The improvement of claim 14 wherein the bi-directional valve is remote from the air regulation device.

27. The improvement of claim 26 wherein the bi-directional valve is mounted on an auxiliary air appliance.

28. A respiratory protection system comprising:
an air regulation device;
a three-way splitter disposed within the air regulation device, the three-way splitter fluidly connecting a first air passageway, a second air passageway and a third air passageway;
an air supply line attached to the first air passageway;
a respirator attached to the second air passageway; and
a bi-directional valve disposed in the third air passageway wherein the bi-directional valve allows no more than a pre-determined level of airflow downstream and no airflow upstream.

29. The respiratory system of claim 28, and further comprising:
an auxiliary air appliance attached to the third air passageway.

30. The respiratory protection system of claim 28 wherein the bi-directional valve comprises:
a valve body having an inlet, an outlet and a valve chamber extending between the inlet and the outlet;
a gasket radially disposed in the valve chamber;
a valve seat radially disposed in the valve chamber between the gasket and the outlet, the valve seat including a radially extending shoulder;
a valve piston having a head, the piston slidably disposed in the valve chamber with the head located between the gasket and the shoulder wherein the piston is movable between a first position, a second position and a third position;
a valve spring disposed between the head of the piston and the shoulder wherein the spring biases the piston toward the first position;
wherein in the first position the head of the piston abuts the gasket to create a first seal and prevent air from flowing from the outlet to the inlet;
wherein in the second position the head of the piston is between the gasket and the shoulder, and air is permitted to flow from the inlet to the outlet; and
wherein in the third position the head of the piston abuts the shoulder to create a second seal and prevents air from flowing from the inlet to the outlet.

31. The respiratory protection system of claim 30, and further comprising:
a first region of the valve between the head of the piston and the inlet; and
a second region of the valve between the head of the piston and the valve seat, wherein a first force in the first region is comprised of air pressure and a second force in the second region is comprised of air pressure and spring pressure.

32. The respiratory protection system of claim 31 wherein when the piston is in the first position the first force is less than the second force.

33. The respiratory protection system of claim 31 wherein when the piston is in the second position the first force is approximately equal to the second force such that the head of the piston floats between the gasket and the valve seat.

34. The respiratory protection system of claim 31 wherein when the piston is in the third position the first force is greater than the second force.

35. A method for regulating airflow through an air regulation device connecting a respirator and an auxiliary air appliance to an air supply line, the method comprising:
supplying air to the air regulating device from the air supply line at a supply air pressure;
disposing a moveable airflow barrier between the air supply line and the auxiliary air appliance;
permitting air to flow to the auxiliary air appliance from the air supply line when an upstream force on the airflow barrier is equal to or greater than a downstream force on the airflow barrier, up to a predetermined force differential between the first and second forces where no flow is permitted, wherein the upstream force is defined in part by auxiliary air appliance air pressure; and
preventing air from flowing from the auxiliary air appliance toward the respirator.

* * * * *

UNITED STATES PATENT AND TRADEMARK OFFICE
CERTIFICATE OF CORRECTION

PATENT NO. : 7,328,700 B2  Page 1 of 1
APPLICATION NO. : 10/383713
DATED : February 12, 2008
INVENTOR(S) : Derek S. Baker It is certified that error appears in the above-identified patent and that said Letters Patent is hereby corrected as shown below:

Column 1
Line 58, delete "hi-directional" and insert -- bi-directional --, therefor.

Column 9
Line 54, in Claim 6, delete "flowpath;" and insert -- flow path; --, therefor.
Line 56, in Claim 6, delete "flowpath," and insert -- flow path, --, therefor.

Column 11
Line 39, in Claim 29, after "respiratory" insert -- protection --.

Signed and Sealed this

Twenty-second Day of July, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,328,700 B2 | Page 1 of 1 |
| APPLICATION NO. | : 10/383713 | |
| DATED | : February 12, 2008 | |
| INVENTOR(S) | : Derek S. Baker | |

It is certified that error appears in the above-identified patent and that said Letters Patent is hereby corrected as shown below:

<u>Title Page</u>

After "Item [73] Assignee:", insert -- 3M Innovative Properties Company, St. Paul, Minnesota --.

Signed and Sealed this

Thirtieth Day of December, 2008

JON W. DUDAS
*Director of the United States Patent and Trademark Office*